(12) United States Patent
Eisele (10) Patent No.: US 7,054,803 B2
(45) Date of Patent: May 30, 2006

(54) EXTRACTING SENTENCE TRANSLATIONS FROM TRANSLATED DOCUMENTS

(75) Inventor: Andreas Eisele, Saarbruecken (DE)

(73) Assignee: Xerox Corporation, Stamford, CT (US)

( * ) Notice: Subject to any disclaimer, the term of this patent is extended or adjusted under 35 U.S.C. 154(b) by 1173 days.

(21) Appl. No.: 09/738,990

(22) Filed: Dec. 19, 2000

(65) Prior Publication Data

US 2002/0107683 A1     Aug. 8, 2002

(51) Int. Cl.
*G10L 17/28* (2006.01)

(52) U.S. Cl. .............................. 704/2; 704/7

(58) Field of Classification Search ............ 704/2, 704/277, 9
See application file for complete search history.

(56) References Cited

U.S. PATENT DOCUMENTS

| | | | | |
|---|---|---|---|---|
| 6,131,082 | A * | 10/2000 | Hargrave et al. | 704/7 |
| 6,182,026 | B1 * | 1/2001 | Tillmann et al. | 704/2 |
| 6,304,841 | B1 * | 10/2001 | Berger et al. | 704/2 |
| 6,332,118 | B1 * | 12/2001 | Yamabana | 704/9 |
| 6,349,276 | B1 * | 2/2002 | McCarley | 704/8 |
| 2002/0040292 | A1 * | 4/2002 | Marcu | 704/4 |

FOREIGN PATENT DOCUMENTS

WO     WO 00/34890     6/2000

OTHER PUBLICATIONS

Baeza-Yates, Ricardo A. Gonnet, Gaston H. "A Fast Algorithm on Average for All-Against-All Sequence Matching", String Processing and Information Retrieval Symposium 1999, pp. xxiii+363.*

Brown, Peter F., Jennifer C. Lai, and Robert L. Mercer. "Aligning sentences in parallel corpora". In Proceedings of ACL'91, pp. 169-176, Berkeley, CA. 1991.

Chen, S. F. "Aligning sentences in bilingual corpora using lexical information". In Proceedings of ACL'93, pp. 9-16, Columbus, Ohio. 1993.

Church, Ken. "Char_align: a program for aligning parallel texts at the character level". In Proceedings of ACL'93, pp. 1-8, Columbus, Ohio. 1993.

Fung, Pascale. "A pattern matching method for finding noun and proper noun translations from noisy parallel corpora". In Proceedings of ACL'95, pp. 236-233, Boston, Massachusetts. 1995.

(Continued)

*Primary Examiner*—David Hudspeth
*Assistant Examiner*—Matthew J. Sked
(74) *Attorney, Agent, or Firm*—Oliff & Berridge, PLC (57) ABSTRACT

A system extracts translations from translated texts, such as sentence translations from translated versions of documents. A first and a second text are accessed and divided into a plurality of textual elements. From these textual elements, a sequence of pairs of text portions is formed, and a pair score is calculated for each pair, using weighted features. Then, an alignment score of the sequence is calculated using the pair scores, and the sequence is systematically varied to identify a sequence that optimizes the alignment score. The invention allows for fast, reliable and robust alignment of sentences within large translated documents. Further, it allows to exploit a broad variety of existing knowledge sources in a flexible way, without performance penalty. Further, a general implementation of dynamic programming search with online memory allocation and garbage collection allows for treating very long documents with limited memory footprint.

20 Claims, 9 Drawing Sheets

OTHER PUBLICATIONS

Fung, Pascale and Ken W. Church. "K-vec : a new approach for aligning parallel texts". In Proceedings of ACL'94. 1994.

Fung, Pascale and K. McKeown. Aligning noisy parallel corpora across language groups: word pair feature matching by dynamic time warping. In Proceedings of AMTA 94, pp. 81-88, Columbia, Maryland. 1994.

W. Gale & K. W. Church, "A Program for Aligning Sentences in Bilingual Corpora". Proceedings of the 29th Annual Meeting of the Association for Computational Linguistics, Berkeley, CA, 1991.

Hunt, J.W. and T.G. Szymanski. "A fast algorithm for computing longest common subsequences". Communications of the ACM, vol. 20, No. 5, pp. 350-353. 1977.

Isabelle, Pierre and Michel Simard. "Propositions pour la representation et l'évaluation des alignements de textes paralleles dans l'ARC A2". Technical report, CITI, Laval, Canada. 1996.

Kay, Martin and Martin Roscheisen. "Text-translation alignment". Computational Linguistics 19(1):121-142. 1993.

Langlais, Ph., M. Simard, and J. Veronis. "Methods and practical issues in evaluating alignment techniques". In COLING-ACL 1998, pp. 711-717, Montreal, Canada. 1998.

Langlais, Ph., M. Simard, J. Veronis, S. Armstrong, P. Bonhomme, F. Debili, P. Isabelle, E. Souissi, and P. Theron. "Arcade: A co-operative research project on bilingual text alignment". In Proceedings of First International Conference on Language Resources and Evaluation (LREC), pp. 289-292, Granada, Spain. 1998.

Melamed, I. Dan. "A portable algorithm for mapping bitext correspondence". In ACL/EACL'97, pp. 305-312, Madrid, Spain. 1997.

Melamed, I. Dan. "Bitext maps and alignment via pattern recognition". Computational Linguistics, 25(1):107-130. 1999.

Shemtov, Hadar. "Text alignment in a tool for translating revised documents". In Proceedings of EACL93, Utrecht. 1993.

Simard, M., G. Foster, and P. Isabelle. "Using cognates to align sentences in bilingual corpora". In Proceedings of the Fourth International Conference on Theoretical and Methodological Issues in Machine Translation (TMI), pp. 67-81, Montreal, Canada. 1992.

Simard, M. and P. Plamondon. "Bilingual sentence alignment: balancing robustness and accuracy". In Proceedings of the Second Conference of the Association for Machine Translation in the Americas (AMTA-96), pp. 135-144, Montreal, Quebec. 1996.

Stephen, Graham A. "String search". Technical Report TR92gas01, University of Wales, 1992.

Trados WinAlign Product Brochure available on the Internet at: http://www.translation.net/imgbin/winalign.pdf.

Melamed, I. Dan; "A Portable Algorithm for Mapping Bitext Correspondence;" Proceedings of $35^{th}$ Annual Meeting on Association for Computational Linguistics, 'Online!; 1997, Madrid, Spain, XP002346159; URL:http://portal.acm.org/citation.cfm?id=979656&jmp=abstract&dl=GUIDE&dl=ACM; paragraphs 002-003, pp. 307.

Simard, M. et al.; "Bilingual Sentence Alignment: Balancing Robustness and Accuracy;" The Institution of Electrical Engineers, Stevenage, GB; DATABASE INSPEC 'Online!; 1998, XP002346164; Database Accession No. 6116180; Machine Translation Kluwer Academic Publisher Netherlands; vol. 13, No. 1, 1998, pp. 59-80, XP002346162.

Chen, Stanley F.; "Aligning Sentences in Bilingual Corpora Using Lexical Information;" Proceedings of the $31^{st}$ Annual Meeting on Association for Computational Linguistics, 'Online!; 1993,; Columbus, OH; XP002346160; URL:http://portal.acm.org/citation.cfm?id=981576.

* cited by examiner

EXTRACTING SENTENCE TRANSLATIONS FROM TRANSLATED DOCUMENTS

BACKGROUND OF THE INVENTION

1. Field of the Invention

The invention generally relates to extracting translations from translated texts, and in particular to extracting sentence translations from translated documents.

2. Description of the Related Art

Translation memories require the alignment of the sentences in a source document with the sentences in a translated version of the same document. These sentence/translation pairs serve as a starting point for human translation when the same sentence appears in a new version of the document that has to be translated again. Alignment on sentence level is also a prerequisite for the extraction of bilingual and multilingual lexical and terminological information from existing bilingual and multilingual documents.

Presently, several techniques have been developed for identifying the translation of individual sentences from translated documents. These techniques are based on sentence length criteria or on lexical information.

Length-based approaches are examples of knowledge-poor approaches which ignore most of the available information, except for the sentence length. These approaches have been successfully applied to documents of relatively high quality such as translations of political and legal texts. While these algorithms are rather simple in their structure and work quite fast, these approaches are known to be sensitive to noise, for instance in case of unreliable sentence segmentation due to OCR noise, or translations with long omissions. The length-based approaches do not work well in particular when sentence boundaries cannot be determined with high reliability. Moreover, these algorithms have a cost that grows with the product of the number of units to align. As these algorithms are based on straightforward dynamic programming techniques, the time and memory consumption grows with the product of the lengths of the given documents. Thus, when working on pairs of large documents, their space and memory requirement make them impractical, unless the data is previously manually decomposed into shorter units. That is, very long documents need to be manually split into shorter parts before they can be given to the alignment algorithm.

Techniques based on lexical information offer a high quality and more robustness, but at the price of increased computational complexity. These techniques are knowledge-rich approaches which use lexical information to obtain better alignments, and which at the same time extract lexical information from the texts to be aligned. The approaches mostly increase accuracy and robustness of the length-based approaches by taking into account some form of lexical information which is either built into the system (such as word similarities to exploit cognates and other invariant strings), acquired from external resources such as dictionaries, or extracted from the data being processed. The use of richer knowledge sources often comes at a considerable cost in efficiency, and typical processing speeds are in the order of one second per sentence pair which is not satisfactory for a system that is supposed to work on very large documents or document collections.

SUMMARY OF THE INVENTION

The present invention has being made in consideration of the above situation, and has as its primary object to provide a method and system for extracting translations from translated texts that offer high quality and are robust against noisy data, but which still run fast and reliably.

It is another object of the present invention to be flexible with respect to the knowledge sources that can be exploited, i.e. to offer a uniform way of mapping a large variety of useful knowledge sources into a uniform formalization.

It is still another object of the present invention to allow for efficient memory usage by providing a fast and general implementation of a dynamic programming search, thus drastically reducing the memory consumption.

A further object of the present invention is to provide a method and system suitable for operating on large documents in an efficient, accurate and sufficiently fast way, with low requirements for user interaction.

Another object of the present invention is to be capable of being applied by end users to documents from a broad variety of languages, sizes and styles, and to provide an algorithm which is modular and simple to implement and to maintain.

These and other objects of the present invention will become apparent hereinafter.

To achieve these objects, the present invention provides a method of extracting translations from translated texts, wherein the method comprises the steps of accessing a first text in a first language; accessing a second text in a second language, the second language being different from the first language, the second text being a translation of the first text; dividing the first text and the second text each into a plurality of textual elements; forming a sequence of pairs of text portions from said pluralities of textual elements, each pair comprising a text portion of the first text and a text portion of the second text, each text portion comprising zero or more adjacent textual elements, each textual element of the first and the second text being comprised in a text portion of the sequence; calculating a pair score of each pair in the sequence using the number of occurrences of each of a plurality of features in the text portions of the respective pair and using a plurality of weights, each weight being assigned to one feature of said plurality of features; calculating an alignment score of the sequence using said pair scores, said alignment score indicating the translation quality of the sentence; and optimizing said alignment score by repeating said forming and calculating steps.

The invention further provides a system for extracting translations from translated texts, wherein the system comprises a pre-processor for accessing a first text in a first language, accessing a second text in a second language, the second language being different from the first language, the second text being a translation of the first text, and dividing the first text and the second text each to a plurality of textual elements; and a processor for identifying an optimal sequence of pairs of text portions from said pluralities of textual elements, each pair comprising a text portion of the first text and a text portion of the second text, each text portion comprising zero or more adjacent textual elements, each textual element of the first and the second text being comprised in a text portion of the sequence; the processor further being arranged for calculating a pair score of each pair in the sequence using the number of occurrences of each of a plurality of features in the text portions of the respective pair and using a plurality of weights, each weight being assigned to one of said plurality of features, calculating an alignment score of the sequence using said pair scores, said alignment score indicating the translation quality of the sequence, optimizing said alignment score by systematically searching through the space of alternatives and combining optimal alignments for subsequences into optimal alignments for longer sequences.

BRIEF DESCRIPTION OF THE DRAWINGS

The accompanying drawings are incorporated into and form a part of the specification to illustrate several embodiments of the present invention. These drawings together with the description serve to explain the principles of the invention. The drawings are only for the purpose of illustrating preferred and alternative examples of how the invention can be made and used and are not to be construed as limiting the invention to only the illustrated and described embodiments. Further features and advantages will become apparent from the following and more particular description of the various embodiments of the invention, as illustrated in the accompanying drawings, wherein.

DETAILED DESCRIPTION

The illustrative embodiments of the present invention will be described with reference to the figure drawings wherein like elements and structures are indicated by like reference numerals.

Figure 1:
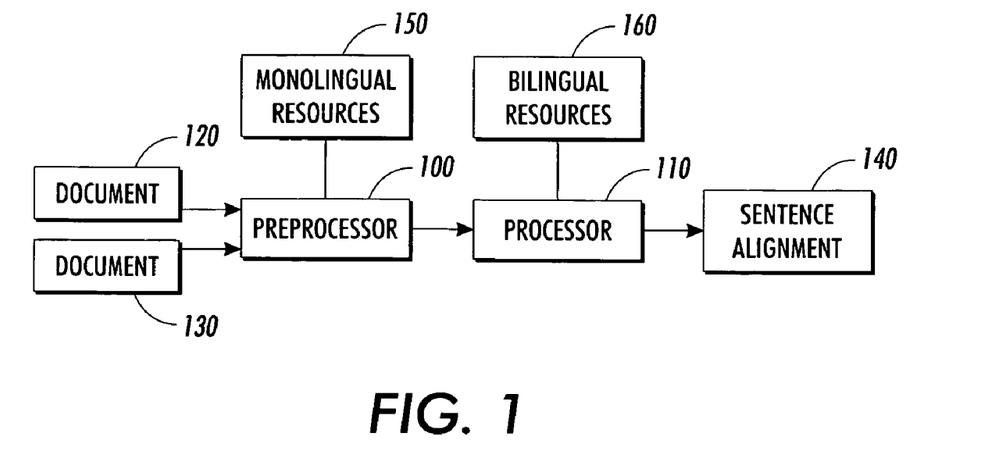
FIG. 1 illustrates a system according to a preferred embodiment of the present invention.

Referring now to the drawings and particularly to FIG. 1, the system according to a preferred embodiment of the present invention comprises a pre-processor 100 and a processor 110. The pre-processor 100 receives two source documents 120, 130 which are assumed to contain the same text in different languages. Preferably, the given texts represent the same contents in essentially the same order, and deviations in order are considered only on the level of small groups of sentences. The pre-processor 100 performs monolingual pre-processing and extracts monolingual lexical and structural information by accessing monolingual resources 150. This will be described in more detail when discussing the process depicted in the flow chart of FIG. 3.

The output of pre-processor 100 is forwarded to the processor 110 which extracts a list of relevant features and searches the best path through the space of potential alignments. As will be described hereinafter, the processor preferably makes use of bilingual resources 160 which might be bilingual dictionaries, bilingual terminology databases, wordlists etc. The best monotonic sentence alignment 140 is then output from processor 110.

As will be appreciated by those of ordinary skill in the art, while the pre-processor 100 and the processor 110 have been depicted in FIG. 1 as separate units they may likewise be arranged as one unique unit, in a hardware as well as a software embodiment.

Figure 2:
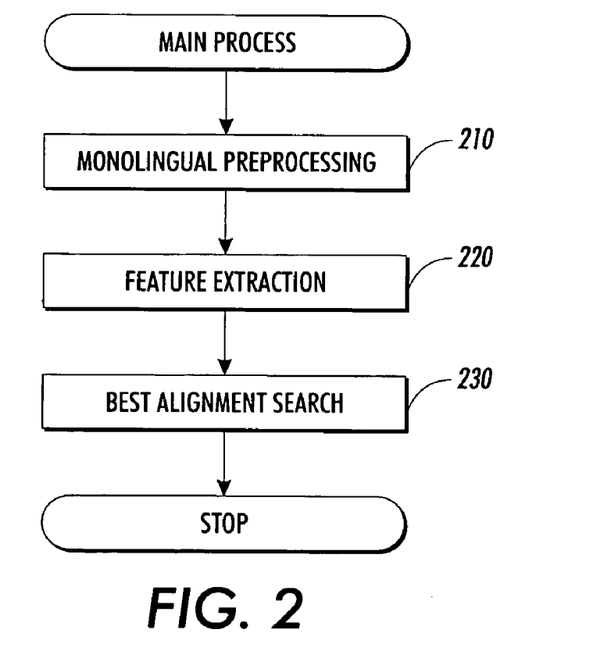
FIG. 2 illustrates the main process of extracting sentence translations from translated documents in a preferred embodiment of the invention.

Turning now to FIG. 2 which illustrates the main process of extracting sentence translations from source documents 120, 130, the process can be divided into three main steps 210 to 230. First, the process performs monolingual pre-processing and extraction of monolingual lexical and structural information. Then, a list of relevant features is extracted and finally, the best path through the space of potential alignments is searched.

The step 210 of monolingually pre-processing the source documents will now be described in more detail with reference to FIG. 3. In steps 310, 350 the source documents 120, 130 undergo segmentation into sentences, paragraphs, or larger units. Then, their textual contents are divided into a sequence of tokens, or textual elements, for which normalized forms are obtained preferably by lemmatization, case normalization and truncation. Finally, in steps 340, 380, the frequencies of the normalized forms that occur in the documents are counted and stored for later use.

Figure 3:
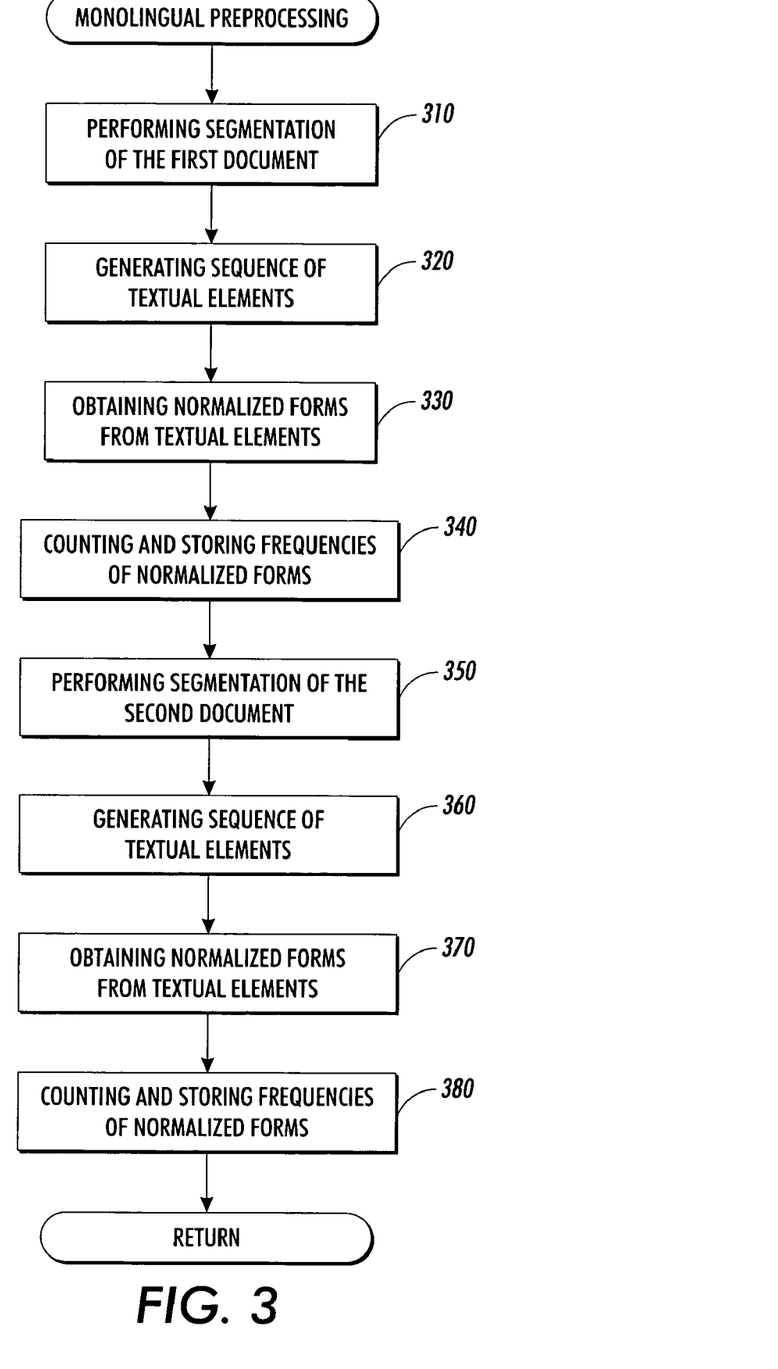
FIG. 3 illustrates in more detail the monolingual pre-processing performed in the process of FIG. 2.

While the flowchart of FIG. 3 indicates that in the present embodiment the first document is pre-processed first, it will be appreciated by those of ordinary skilled in the art that the sequence of operating on the first and second source documents 120, 130 may differ from the illustrated embodiment. In particular, it is within the scope of the invention that the documents may be pre-processed in parallel.

The next step in the main process depicted in FIG. 2 is to define a set of weighted features or properties $p_i$ that may be relevant in the assessment of partial alignments. The notion of weighted features is a very general way of making use of many different knowledge sources, ranging from lexical information over length-based heuristics up to document structure and formatting information in the text. As will be explained in more detail below, a collective weight of all feature occurrences that can be matched across a hypothetical alignment is taken as a measure of quality of that alignment.

Figure 4:
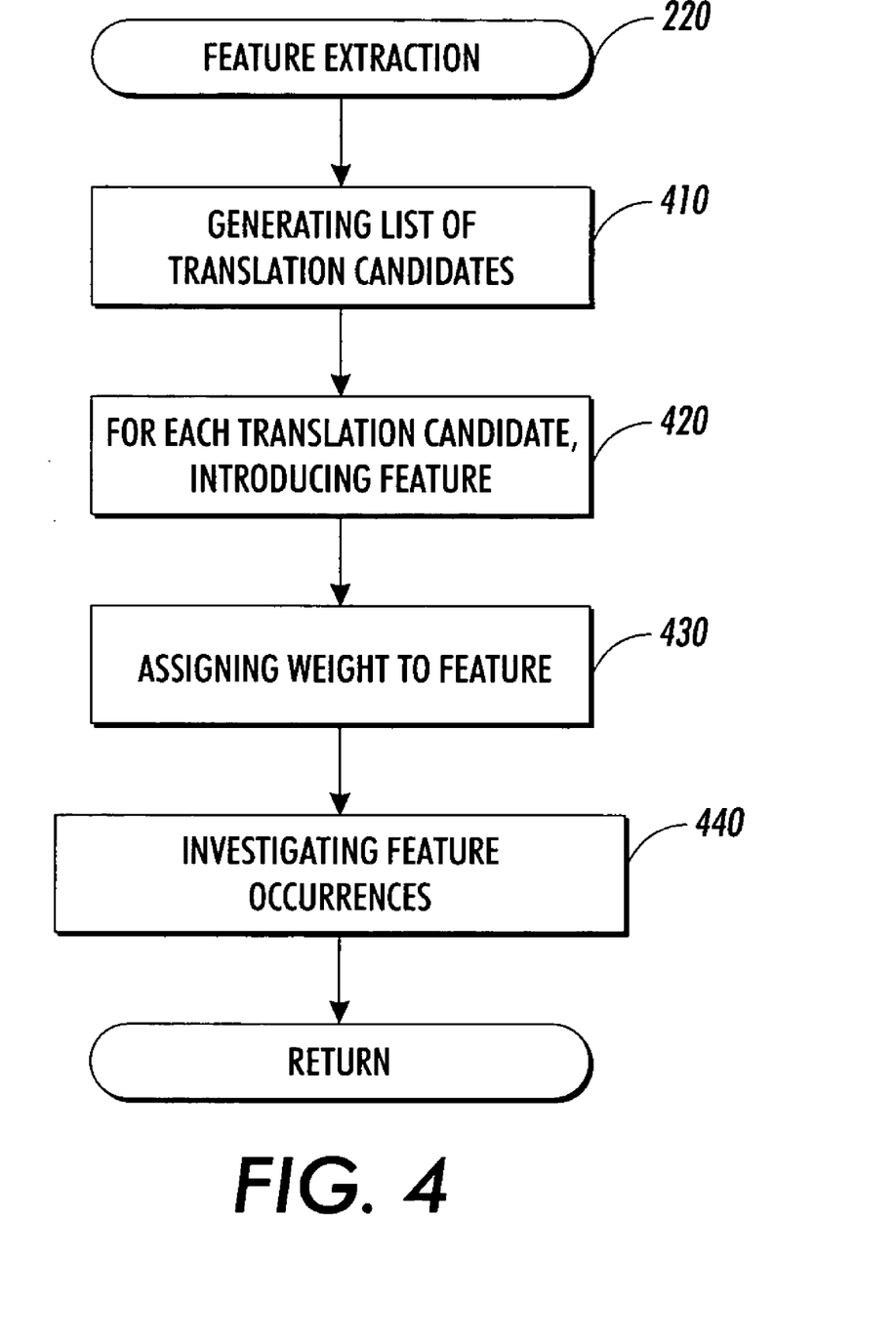
FIG. 4 illustrates in more detail the feature extraction performed in the process of FIG. 2.

Turning now to FIG. 4 which illustrates the main steps of the process of extracting the relevant features, a list of potential translations ($w_1$, $w_2$) is generated in step 410. Then, for each translation candidate that has being identified, a feature $p_i$ is introduced in step 420. In step 430, each feature $p_i$ corresponding to a translation candidate is annotated with a weight $\pi_i$ that reflects it importance. Natural ways of assigning weights to translation candidates are to use their length in characters, or an estimate of information content based on the negative logarithm of their relative frequencies in the corpus, or some suitable linear combination of these values. In cases where the frequencies of the normalized forms in the source documents, obtained in steps 340, 380, do not match very well, this can be accounted for by reducing the weight of the corresponding feature. Other properties of the text that may be useful for accessing the match between segments of the documents can be treated formally in the same way. For instance, the length of a segment may be a relevant feature. If sentences of very different lengths are aligned, only the information in the less informative of these sentences can be explained by the alignment. Therefore, the minimal length (or information content) of two aligned segments is preferably used as a score for the quality of the alignment. This can be done by treating any character within the text as a feature which has then assigned a very low weight. Also, formatting information or segment boundaries in the texts can be treated like the occurrence of special tokens, so that alignments between segments that agree in these properties can achieve higher scores. Thus, after assigning weights to features, the feature occurrences are investigated in step 440.

Figure 5:
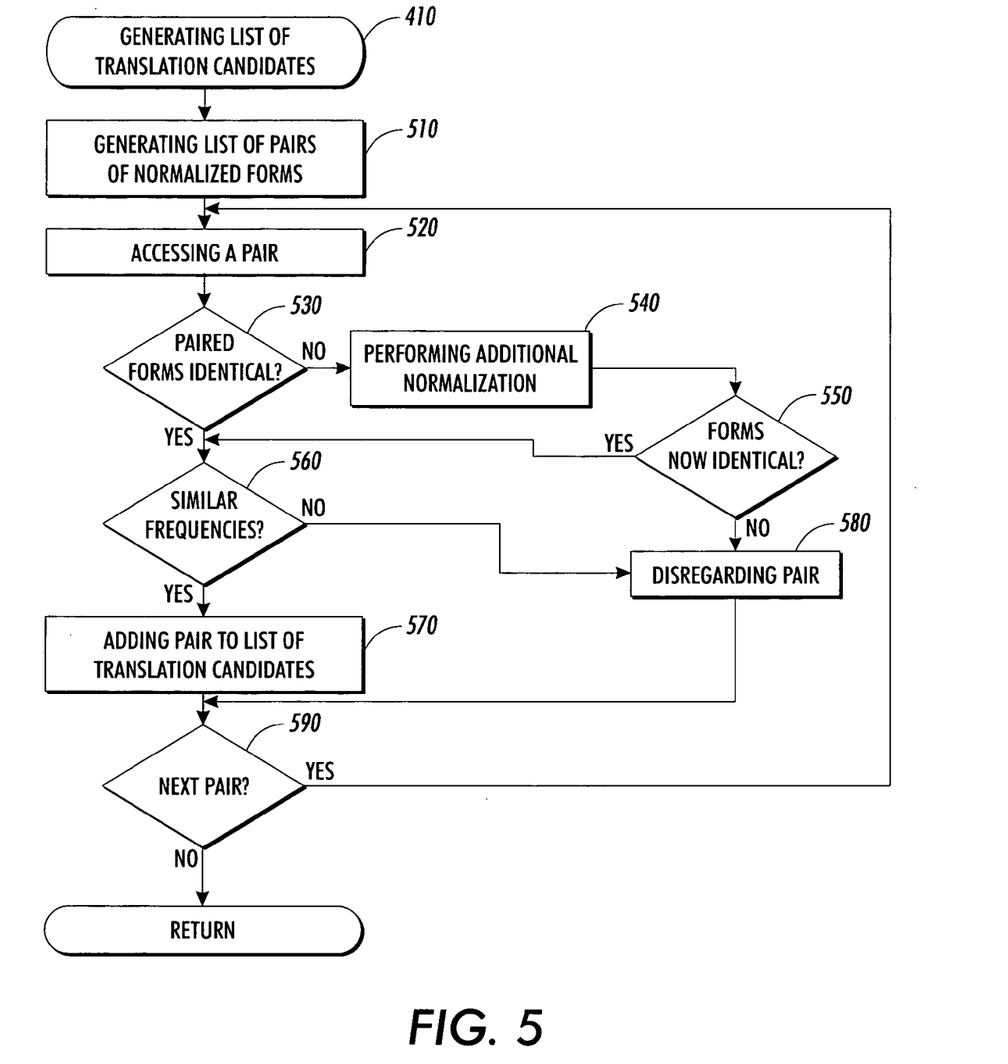
FIG. 5 illustrates the process of generating a list of translation candidates, performed in the process depicted in FIG. 4.
Figure 6:
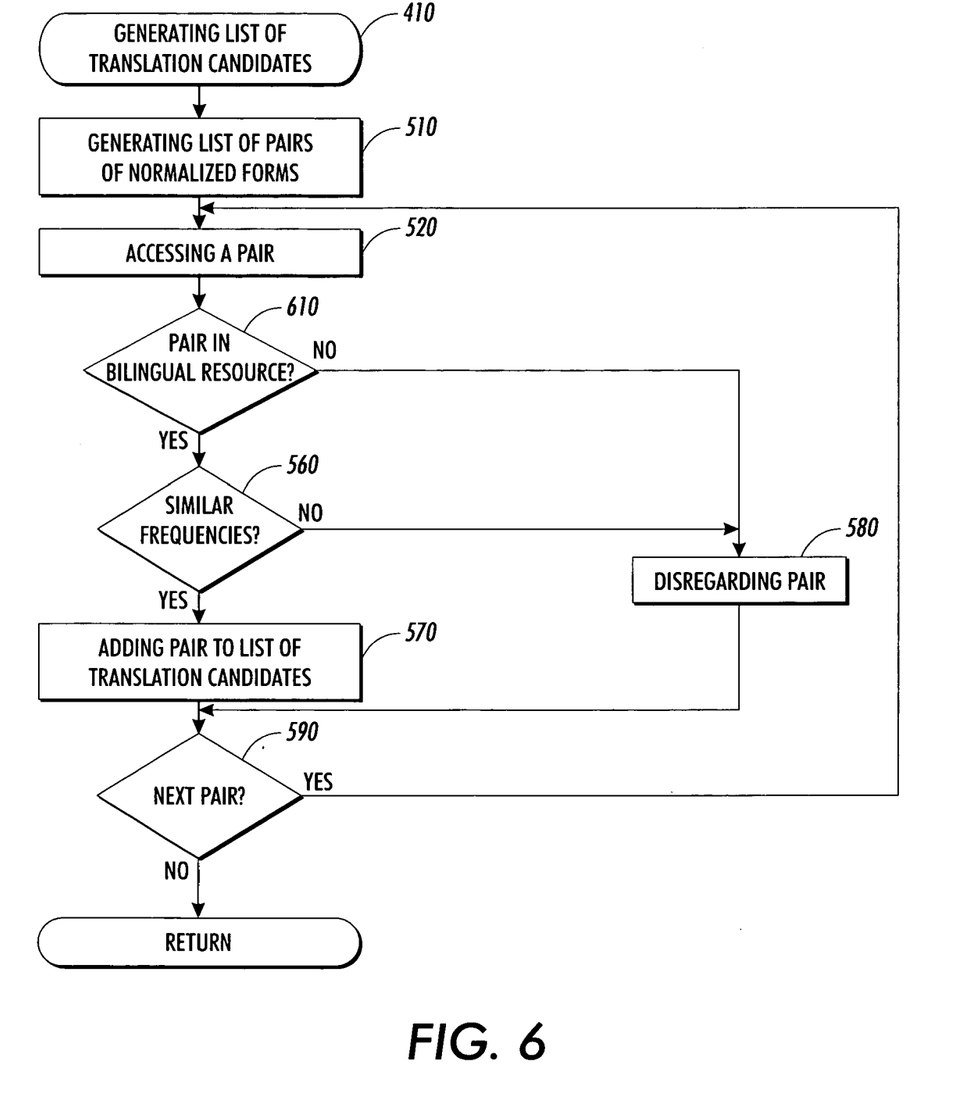
FIG. 6 illustrates another embodiment of the process of generating a list of translation candidates.

Referring now to FIGS. 5 and 6, preferred embodiments of the generation sub-process performed in step 410 will be described in more detail. Referring first to FIG. 5, the list of potential translations is generated based on a similarity evaluation of the word forms and their frequencies. After generating a list of pairs of normalized forms in step 510, the pairs are sequentially accessed (steps 520, 590). If the forms are identical or almost identical and the frequencies of the forms and the respective documents are sufficiently similar, these forms are taken as translation candidates. Therefore, it is determined in step 530, whether the paired forms are identical. If so, it is determined in step 560 whether the frequencies are sufficiently similar. This can be done for instance by requiring that $\min(f_1, f_2)/\max(f_1, f_2) > c$ where c can be empirically optimized in cross-validation. If it is determined that the frequencies are sufficiently similar the pair is added to the list of translation candidates in step 570.

If it is however determined in step 530, that the paired forms are not identical, it is checked whether the forms may be considered as being almost identical. For this purpose, an additional normalization is performed in step 540 which preferably includes steps of removing accents and inessential non-alphanumeric characters, case normalization, or the like. After performing a certain number of additional normalization steps, near similarity is checked by comparing the additionally normalized forms in step 550. If these forms can be determined as identical, the process continues with the step 560. If there is however no identity or near similarity of the paired forms, or if the frequencies are not similar, the pair is disregarded (step 580).

Another embodiment of generating a list of translation candidates is illustrated in FIG. 6. If some bilingual resource 160 like a word list, a dictionary, or a terminology database is available, and if the respective pair of forms appears in the bilingual resource and the frequencies are sufficiently similar, the pair is added to the list of translation candidates. Thus, the process of FIG. 6 differs from the embodiment of FIG. 5 mainly in that it accesses a bilingual resource in step 610.

As mentioned above, one improvement of the present invention is to take the collective weight of all feature occurrences that can be matched across a hypothetical alignment as a measure of quality of that alignment. This combination of all the measures and criteria into one alignment score can be done in a simple and straightforward way. Let $d_1$ and $d_2$ be any regions within the two given documents 120, 130, let $\pi_i$ be the weight of feature $p_i$ and let $f_{d_i}(p)$ be the number of occurrences of feature p in region $d_i$, then the score of the alignment of the two regions is defined as:

$$score(d_1, d_2) = \sum_{p_i} \pi_i \cdot \min(f_{d_1}(p_i), f_{d_2}(p_i)).$$

It will be appreciated by those of ordinary skill in the art that the score can be computed in time $O(\min|d_1|,|d_2|)$, i.e. almost linear with the sum of the region lengths, by looking only at the features that actually occur in these regions.

Given the segmented documents from performing the pre-processing, and the mapping from text positions to feature occurrences by performing the feature extraction, the last step 230 of the main process depicted in FIG. 2 makes decisions on the level of the segments identified in the first step 210, and the uses the features identified in the second step 220 as a criterion to optimize.

This will now be described in more detail with reference to FIG. 7.

The search for the best path through the space of potential alignments is based on the idea of dynamic programming, and tries to determine a sequence of m aligned segments $\hat{A}=(S_0, T_0), (S_1, T_1), \ldots, (S_m, T_m)$, where each $S_i$ or $T_i$ is the concatenation of a certain number, including zero, of adjacent segments from documents 120, 130, respectively, and the sequence $S_0, S_1, \ldots, S_m$ covers all the segments from the first document 120 and the sequence $T_0, T_1, \ldots, T_m$ covers all the segments from document 130. This is done in step 710.

The alignment $\hat{A}$ is chosen in a way that the overall weight of matched features is maximized. For this purpose, a pair score $score(S_i, T_i)$ is calculated in step 720 for each pair. The total alignment score is then calculated in step 730 by summing up the pair scores of all pairs of the alignment, i.e.

$$score(A) = \sum_{(S_i, T_i) \in A} score(S_i, T_i).$$

The alignment $\hat{A}$ is then chosen in steps 740, 750 in a way that the overall weight of matched features is maximized, i.e.

$$\hat{A} = \underset{A}{\operatorname{argmax}}\, score(A).$$

The dynamic programming implementation of the best alignment search will now be described in more detail with reference to FIG. 7. As will be apparent from the more detailed discussion hereafter, the method to identify the optimum alignment improves over standard dynamic programming search techniques such as those described in W. Gale and K. W. Church 1993, "A program for aligning sentences in bilingual corpora", *Computational Linguistics*, 19(3): 75–102. According to the present invention, the memory used for the intermediate representations is not allocated at once in the beginning of the alignment procedure, but incrementally for the nodes that are introduced during the computation.

Figure 8:
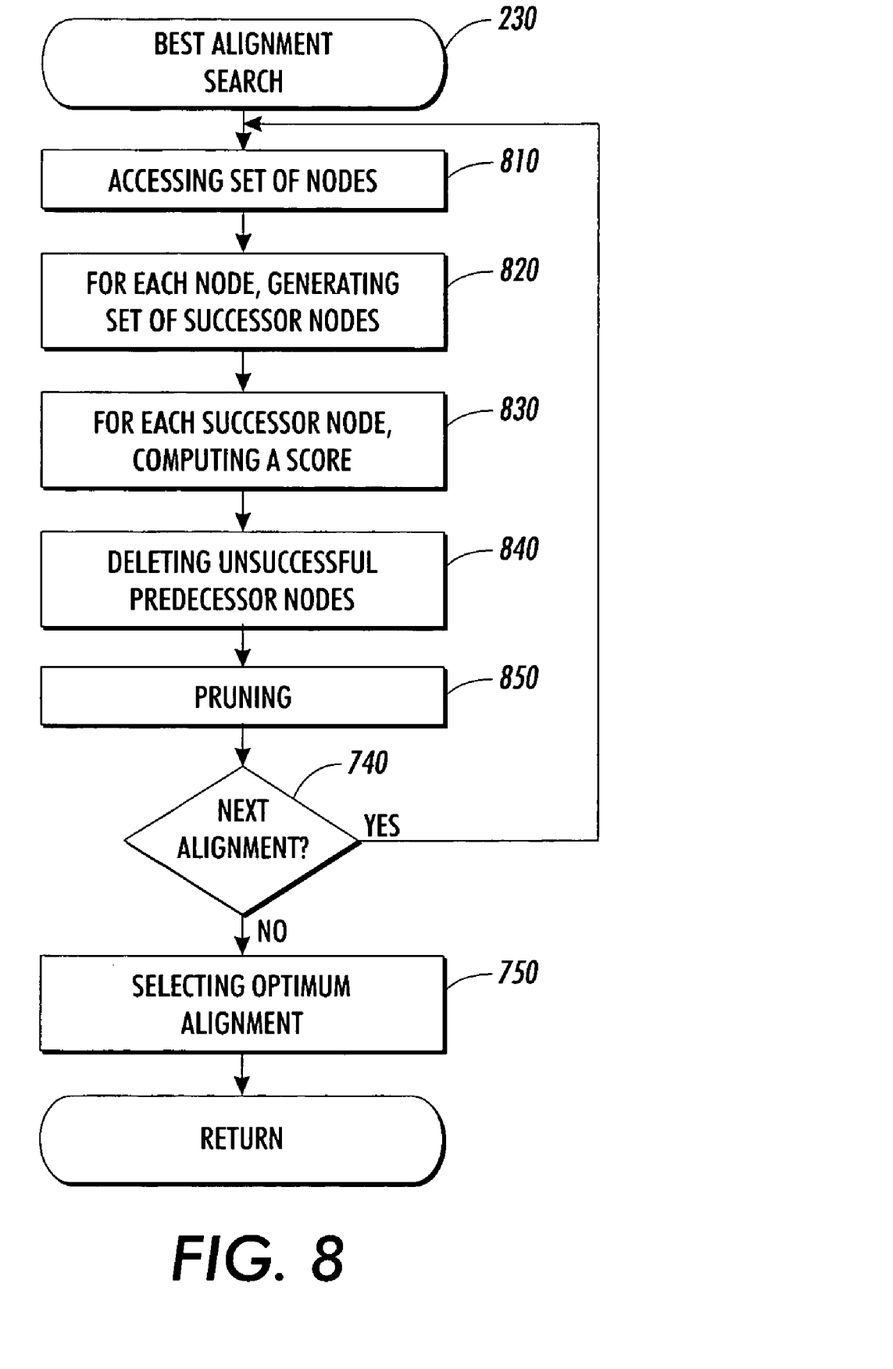
FIG. 8 illustrates the best alignment search in a dynamic programming implementation.

In each step of the algorithm, a set of hypotheses is maintained. This set contains nodes of the form $n=(x_i, y_j)$, which denote pairs of positions in the documents. Each node n is annotated with the score of the best alignment that led to this pair of positions. Furthermore, each node n contains a pointer to a predecessor node n' that took part in the best alignment that led to n.

After accessing the set of nodes in step 810, a set of successor nodes is generated for each node in this set, based on a small set of possible transitions, that each consume a small number of segments in one or both of the documents, starting from the current position. Preferably, the set of possible transitions, include: 0–1, 1–0, and x-y where x, y≧1 and x·y<c for some constant c chosen by the user. This is done in step 820.

In step 830, the new score is computed for each of the nodes that can be reached from one of the current nodes, as the sum of the score of the current node plus the matches achieved in the transition. As will be appreciated by those of ordinary skill in the art, the search for the optimum alignment has to find a good compromise in the trade-off between the matches of segment boundaries and the matches of features within the segments. The exact outcome will dependent on the relative weight of the boundary and the internal features. Transitions that involve the contraction of several segments may be additionally penalized by subtraction of certain constants, and/or by multiplication of the number of matches with a certain constant which is smaller than one.

If transitions from different nodes lead to nodes with identical x and y values, only the path with the best score is retained in the representation.

When all possible extensions from a given node n have been considered, but none of the nodes that have been reached from n refer to n as their best predecessor, the node n can be deleted and the memory used by it can be freed. This kind of memory garbage collection is performed in step 840 and can considerably reduce the memory consumption of the algorithm, e.g. by a factor of 45.

Figure 7:
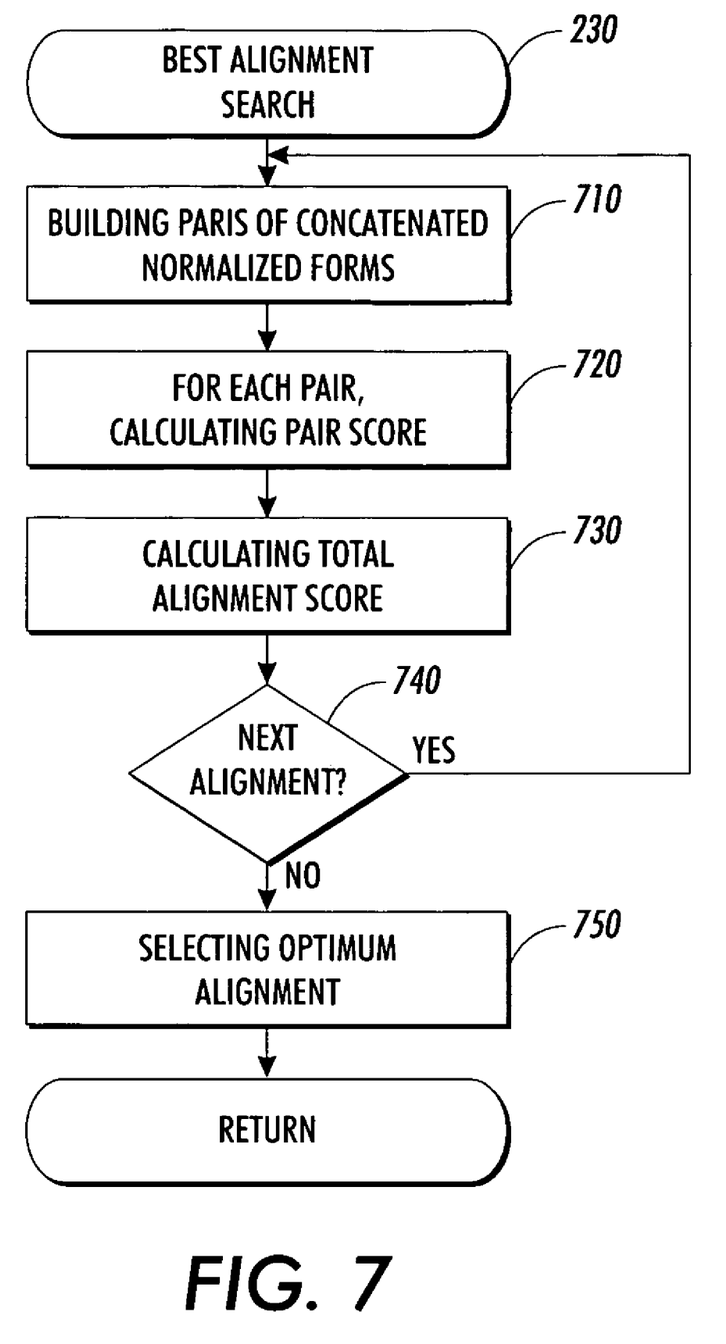
FIG. 7 illustrates the best alignment search performed in the process of FIG. 2.

The algorithm then continues mainly as described when discussing FIG. 7. However, the algorithm can be further optimized by providing a pruning step 850 which will now be described in more detail with reference to FIG. 9. When new nodes are created, the score of the best path to this node is compared with scores of other nodes that span a similar part of the input. If a node n has a score that is considerably worse than the score of a competing node n', it is removed from consideration immediately. Therefore, the pruning process performs the steps of finding competing nodes, comparing these nodes and deleting unsuccessfully competing nodes (steps 910, 920, 930).

Figure 9:
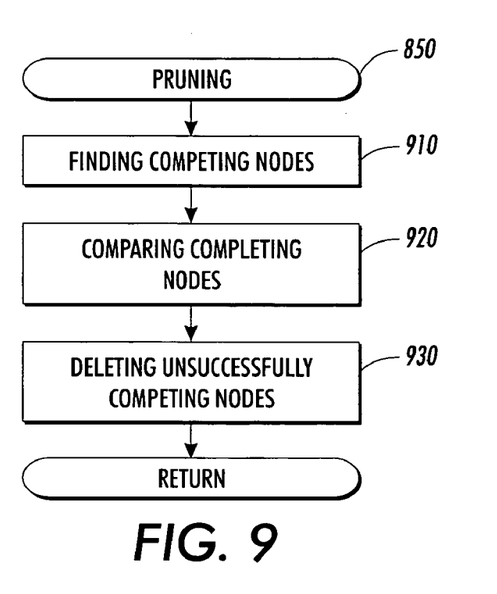
FIG. 9 illustrates in more detail the pruning step performed in the process depicted in FIG. 8.

In a preferred embodiment of the present invention, the following criteria for pruning are used. The user selects a "beam width", i.e. the maximum number of competing positions that are considered at the same time. Preferably, positions (x, y) and (x', y') are said to be competing if x+y=x'+y'. Whenever the number of competing positions exceeds the beam width, the nodes on the margins of the current beam are investigated and the nodes with the worst scores are removed until the maximum allowed beam width is reached.

It will be appreciated that sharp pruning can speed up the algorithm by orders of magnitude. In an example implementation, when the beam width is set to 100, about 350 sentence pairs per second can be aligned on a SUN workstation.

In a further preferred embodiment of the present invention, an estimate of the matches that can be achieved in the alignment of the remaining parts of the text is obtained. This is particularly advantageous when comparing competing nodes as it allows to prune the search space in a more informed way. This is because pruning leads to an incomplete search with a considerable risk of running into dead ends which may introduce non-local alignment errors of substantial size. This risk is particularly high when long parts of one of the documents are not represented in the corresponding document, i.e. when long omissions occur. By obtaining an estimate of the matches that can be achieved in the alignment of the remaining parts of the text, the risk of dead ends can be significantly reduced. There are several ways such a look-ahead can be realized.

Figure 10:
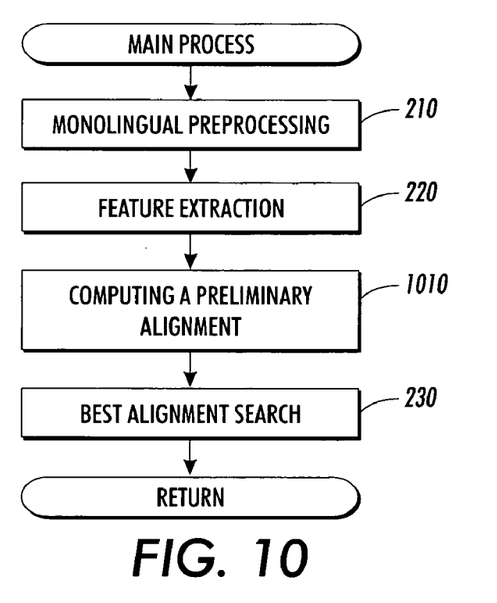
FIG. 10 illustrates the main process according to another preferred embodiment of the invention.
Figure 11:
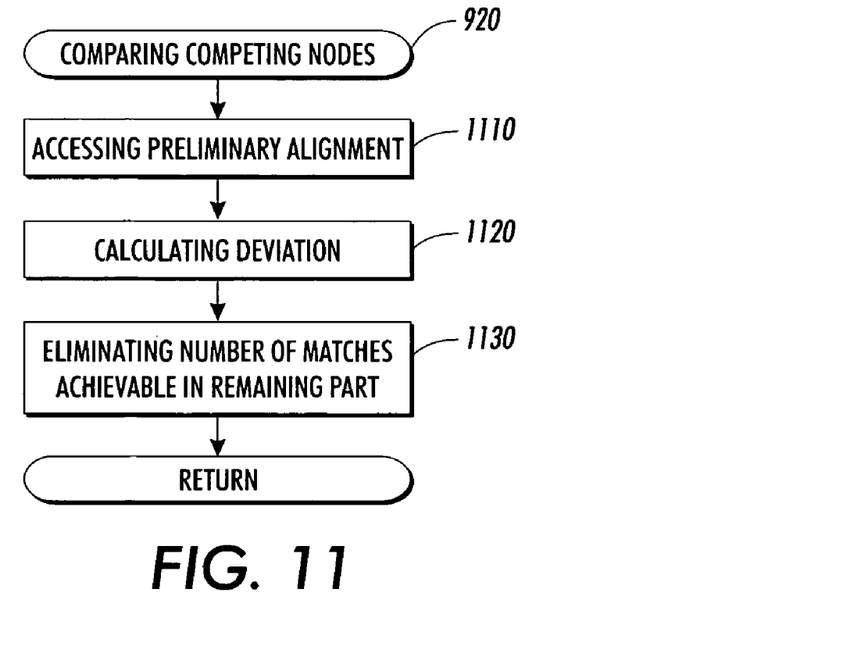
FIG. 11 illustrates the process of comparing competing nodes, performed in the pruning process of FIG. 9.

In a first preferred look-ahead embodiment, an approximate alignment is computed separately before the final alignment. This is illustrated in FIG. 10 by introducing step 1010 to the process depicted in FIG. 2. The deviation of a hypothetical position n' from this first approximation can then be used to derive an estimate for the number of matches that can be achieved in a continuation of this path. Thus, in this first look-ahead embodiment, the process depicted in FIG. 11 includes the steps of accessing the preliminary alignment, calculating the deviation, and estimating the number of matches achievable in the remaining part (steps 1110 to 1130).

Figure 12:
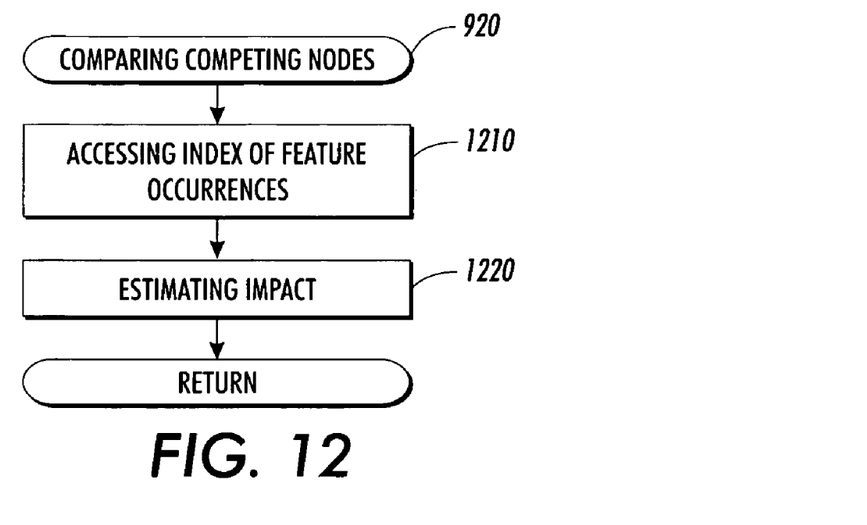
FIG. 12 illustrates another embodiment of the process of comparing competing nodes.

Another embodiment is based on the possibility to determine the maximum amount of matched features that are achievable from each position n' up to the end of the documents in time and space linear in the remaining text length. As there are typically many hypothetical positions to consider which are close to each other in the bitext map, and as the rest of the documents are typically rather long, this computation would be too expensive. According to the present embodiment which is depicted in FIG. 12, the impact of a hypothetical alignment on the number of achievable feature matches in the right context is therefore estimated in a more efficient way, making use of a dedicated index that allows to determine for each feature occurrence where in the corresponding document the corresponding occurrence of the same feature is located. The process therefore includes the steps of accessing the index of feature occurrences and estimating the impact (steps 1210, 1220). This allows to estimate the impact of a partial alignment on the remaining feature matches in time linear in the length of the alignment.

Another way of how to realize the look ahead is preferably based on a backward run (from right to left) of the Hunt/Szymanski algorithm, see J. W. Hunt and T. G. Szymanski, 1977, "A fast algorithm for computing longest common subsequences", *Communications of the ACM*, 20(5): 530ff. In this embodiment, a backward run of the Hunt/Szymanski algorithm is performed in advance and the intermediate results are recorded sequentially in a stack in such a way that they can be "replayed" in reverse order, i.e. during the left-to-right traversal of the alignment matches. This allows for an exact determination of the maximum number of achievable matches in the right context. Preferably, the Hunt/Szymanski algorithm is restricted to a sub-set containing only less frequent features. This is because the algorithm requires to enumerate, for each feature occurrence, all occurrences of this feature in the corresponding document. However, the space consumption is only linear in the length of the shorter document.

As has been shown, the present invention provides a uniform efficient treatment of a variety of knowledge sources. The general implementation of dynamic programming search with online memory allocation and garbage collection allows a treatment of very long documents with limited memory footprint. Further speed up can be achieved by a variety of pruning techniques. The invention enables working on large documents without a memory explosion since it runs in linear time.

Lexical information is used by mapping the word forms of the documents into a shared set of normalized forms. This mapping can be defined flexibly and based on linguistic knowledge sources, such as lemmatizes, normalizes, bilingual dictionaries and terminologies.

Mapping of original word forms to forms from a shared vocabulary of forms allows optimizations that are not achievable with more complex stochastic models. Among other things, global indexes of the occurrences of all the forms and the documents can be constructed, which can be used in an approximation of the matches that can be achieved in the continuation of the search. Using this approximate alignment as a guideline, a separate phase (step 1010) can do the fine work based on more sophisticated criteria, without having to traverse the complete search space, which leads to considerable savings in processing time.

Memory consumption of the method can be reduced drastically by cautious bookkeeping of references to memory cells for intermediate hypotheses. The identification and the recycling of unused memory reduces the memory consumption to an amount that grows almost linear with the sum of the document lengths.

It will therefore be appreciated by those of ordinary skill in the art that the present invention improves over conventional technologies by providing a uniform way of mapping a large variety of useful knowledge sources into a uniform formalization, by providing a fast and general implementation of dynamic programming search that makes use of these knowledge sources in a simple and uniform way, by drastically reducing memory consumption due to recycling of unnecessary memory, and by considerably speeding up the process due to the reduction of the search space, with finding a good compromise between the search speed and the risk of search errors.

While the invention has been described with reference to the preferred physical embodiments constructed in accordance therewith, it will be apparent to those skilled in the art that various modifications, variations and improvements of the present invention may be made in the light of the above teachings and within the purview of the appended claims without departing from the spirit and intended scope of the invention.

For instance, the invention has been described in the context of aligning documents with their translations. While sentence alignment across translations is an essential prerequisite for translation memory and multilingual terminology extraction, the method and system of the present invention can also be used to align multiple versions of monolingual documents, to align speech signals with transcripts, and for identifying alignments between related DNA sequences.

Those areas in which it is believed that those of ordinary skill in the art are familiar, have not been described herein in order to not unnecessarily obscure the invention. Accordingly, it is to be understood that the invention is not to be limited by the specific illustrative embodiments, but only by the scope of the appended claims.

The invention claimed is:

1. Method of extracting translations from translated texts, the method comprising the steps of:
   accessing a first text in a first language;
   accessing a second text in a second language, the second language being different from the first language, the second text being a translation of the first text;
   dividing the first text and the second text each into a plurality of textual elements;
   forming a sequence of pairs of text portions from said plurality of textual elements, each pair comprising a text portion of the first text and a text portion of the second text, each text portion comprising zero or more adjacent textual elements, each textual element of the first and the second text being comprised in a text portion of the sequence;
   calculating a pair score of each pair in the sequence using a number of occurrences of each of a plurality of features in the text portions of the respective pair and using a plurality of weights, each weight being assigned to one feature of said plurality of features, wherein the pair scores are calculated by taking, for each feature occurring in the pair, a minimum number of the number of occurrences of the respective feature in the paired text portions, taking a product of the minimum number and the weight assigned to the respective feature, and summing up all the products of all features;
   calculating an alignment score of the sequence using said pair scores, said alignment score indicating the translation quality of the sequence; and
   optimizing said alignment score by systematically searching through the space of alternatives and combining optimal alignments for subsequences into optimal alignments for longer sequences.

2. The method of claim 1, wherein the dividing step includes a monolingual pre-processing step;
   the monolingual pre-processing includes performing normalization of the textual elements, said normalization including lemmatization, case normalization, or truncation;
   the monolingual pre-processing further includes counting the frequencies of the normalized textual elements that occur in the texts, and storing the frequencies;
   the step of forming said sequence of pairs of text portions includes the steps of retrieving the stored frequencies and pairing text elements having at least similar frequencies; and
   the method further comprises the step of reducing at least one weight assigned to a feature occurring in a text element pair if the difference between the frequencies of the paired textual elements exceeds a certain amount.

3. The method of claim 1, wherein:
   the alignment score is calculated by summing up all the pair scores; and
   the alignment score is optimized by selecting the maximum alignment score.

4. The method of claim 1, wherein said plurality of features include lexical information.

5. The method of claim 1, wherein said plurality of features include document structure and formatting information.

6. The method of claim 1, wherein said plurality of features include any character within the text, the weights of such features being lower than the weights of other features.

7. The method of claim 1, further comprising the step of generating pairs of textual elements, each pair comprising a textual element of the first text and a textual element of the second text;
   wherein the step of generating pairs of textual elements comprises the step of normalizing textual elements; and
   wherein the normalizing step includes removing accents, inessential non-alphanumeric characters, or case normalization.

8. The method of claim 1, further comprising the step of generating pairs of textual elements, each pair comprising a textual element of the first text and a textual element of the second text;

wherein the step of generating pairs of textual elements comprises the step of accessing at least one bilingual resource.

9. The method of claim 1, wherein the first and second texts are provided in the form of a first and second document, the first and second languages being natural languages, and wherein the method is used for extracting sentence translations.

10. The method of claim 1, wherein the first and second texts are provided in the form of speech signals and a transcript thereof.

11. The method of claim 1, wherein the first language is a first set of characters identifying a first DNA sequence and the second language is a second set of characters identifying a second DNA sequence.

12. The method of claim 1, wherein the forming, calculating and optimizing steps are performed in a dynamic programming process comprising the steps of:
  accessing a set of nodes, each node being a pair of positions in the first and second texts, each node being annotated with a node score;
  for each node, generating a set of successor nodes by applying a set of node transitions; and
  for each successor node, calculating a node score using the node score of the node accessed for generating the successor nodes.

13. The method of claim 12, wherein said node score is the score of the best alignment that led to the respective node; and wherein:
  each node has assigned a pointer to a predecessor node that took part in the best alignment that led to the respective node; and
  the process further comprises the step of deleting each node which has no successor node that points to the node as its predecessor node.

14. The method of claim 12, wherein the process further comprises a pruning step of comparing the score of each successor node with the scores of competing nodes spanning a similar part of the first and second texts, and deleting those successor nodes having scores being considerably worse than the scores of the competing nodes.

15. The method of claim 14, further comprising the steps of:
  estimating the number of matches that can be achieved in the alignment of the remaining parts of the texts; and
  using said estimate in comparing the competing nodes.

16. The method of claim 14, further comprising the steps of
  computing an approximate alignment before performing the forming, calculating and optimizing steps; and
  using said approximate alignment in estimating the number of matches.

17. The method of claim 14, wherein the step of estimating the number of matches includes the step of accessing an index for determining for each feature occurrence where in the respective text the feature occurs.

18. The method of claim 14, further comprising the step of performing a backward run of the Hunt/Szymanski algorithm and recording the intermediate results sequentially in a stack such that they can be retrieved in reverse order.

19. A computer readable storage medium storing instructions for performing a method comprising the steps of:
  accessing a first text in a first language;
  accessing a second text in a second language, the second language being different from the first language, the second text being a translation of the first text;
  dividing the first text and the second text each into a plurality of textual elements;
  forming a sequence of pairs of text portions from said plurality of textual elements, each pair comprising a text portion of the first text and a text portion of the second text, each text portion comprising zero or more adjacent textual elements, each textual element of the first and the second text being comprised in a text portion of the sequence;
  calculating a pair score of each pair in the sequence using a number of occurrences of each of a plurality of features in the text portions of the respective pair and using a plurality of weights, each weight being assigned to one feature of said plurality of features, wherein the pair scores are calculated by taking, for each feature occurring in the pair, a minimum number of the number of occurrences of the respective feature in the paired text portions, taking a product of the minimum number and the weight assigned to the respective feature, and summing up all the products of all features;
  calculating an alignment score of the sequence using said pair scores, said alignment score indicating the translation quality of the sequence; and
  optimizing said alignment score by systematically searching through the space of alternatives and combining optimal alignments for subsequences into optimal alignments for longer sequences.

20. A system for extracting translations from translated texts, comprising:
  a pre-processor for accessing a first text in a first language, accessing a second text in a second language, the second language being different from the first language, the second text being a translation of the first text, and dividing the first and the second text each into a plurality of textual elements; and
  a processor for forming a sequence of pairs of text portions from said pluralities of textual elements, each pair comprising a text portion of the first text and a text portion of the second text, each text portion comprising zero or more adjacent textual elements, each textual element of the first and the second text being comprised in a text portion of the sequence, the processor being further arranged for calculating a pair score of each pair in the sequence using a number of occurrences of each of a plurality of features in the text portions of the respective pair and using a plurality of weights, each weight being assigned to one feature of said plurality of features, calculating an alignment score of the sequence using said pair scores, said alignment score indicating the translation quality of the sequence, and optimizing said alignment score by repeating said forming and calculating steps, wherein the pair scores are calculated by taking, for each feature occurring in the pair, a minimum number of the number of occurrences of the respective feature in the paired text portions, taking a product of the minimum number and the weight assigned to the respective feature, and summing up all the products of all features.

* * * * *